US006287459B1

(12) United States Patent
Williamson

(10) Patent No.: US 6,287,459 B1
(45) Date of Patent: Sep. 11, 2001

(54) DRAINWATER TREATMENT SYSTEM FOR USE IN A VERTICAL PASSAGEWAY

(75) Inventor: J. Kelly Williamson, Hixson, TN (US)

(73) Assignee: Remedial Solutions, Inc., Hixson, TN (US)

( * ) Notice: Subject to any disclaimer, the term of this patent is extended or adjusted under 35 U.S.C. 154(b) by 0 days.

(21) Appl. No.: 09/441,306

(22) Filed: Nov. 16, 1999

Related U.S. Application Data

(63) Continuation-in-part of application No. 09/053,431, filed on Apr. 1, 1998, now abandoned.

(51) Int. Cl.[7] .................................................. E03F 5/14
(52) U.S. Cl. ........................... 210/99; 210/164; 210/253; 210/254; 210/259; 210/299; 210/306; 210/317; 210/335; 210/344; 210/502.1
(58) Field of Search .................................. 210/163, 164, 210/299, 317, 335, 339, 99, 253, 254, 259, 361, 262, 305, 306, 337, 344, 502.1

(56) References Cited

U.S. PATENT DOCUMENTS

| 4,906,381 | 3/1990 | Barbaro ................................ 210/335 |
| 5,223,154 | 6/1993 | MacPherson, Jr. et al. ......... 210/163 |
| 5,507,944 | 4/1996 | Freidland et al. .................... 210/155 |
| 5,511,904 | 4/1996 | Van Egmond ........................ 210/164 |
| 5,788,849 | 8/1998 | Hutter, Jr. et al. ................... 210/163 |
| 5,820,762 | 10/1998 | Bamer et al. ......................... 210/163 |

OTHER PUBLICATIONS

Ad. literture—"Hydro–Kleen Filter Ststems", Bamcon Engineering Inc., Castro Valley, CA.
Ad. literature—Unit "H", Suntree Isles, Inc., Cape Canaveral, FL.

Primary Examiner—Matthew O. Savage
(74) Attorney, Agent, or Firm—Michael E. McKee

(57) ABSTRACT

A drainwater treatment system positionable within the vertical passageway of a drainage system utilizes a catch basin for accepting drainwater which flows downwardly into the drainage system and a filter-supporting section disposed alongside the catch basin. The filter-supporting section accepts drainwater which flows therein from the catch basin and permits drainwater to flow downwardly therethrough. First and second filters containing a hydrophobic material are positioned within the filter-supporting section for filtering contaminants from the drainwater flowing downwardly therethrough, and an overflow is associated with the catch basin and the filter-supporting section through which drainwater is permitted to exit the treatment system and bypass the first and second filters when the flow rate of drainwater into the system exceeds the rate at which drainwater is permitted to flow downwardly through the first and second filters.

20 Claims, 4 Drawing Sheets

DRAINWATER TREATMENT SYSTEM FOR USE IN A VERTICAL PASSAGEWAY

This is a continuation-in-part of application Ser. No. 09/053,431 filed Apr. 1, 1998, now abandoned, and entitled DRAINWATER TREATMENT SYSTEM, the disclosure of which is incorporated herein by reference.

BACKGROUND OF THE INVENTION

This invention relates generally, to the treatment of water which passes into the piping of a drainage system by way of a storm drain and relates, more particularly, to filtration systems through which drainwater is routed for purposes of filtering contaminants from the drainwater.

It is known that residue from oil and gasoline spills at service stations, parking lots or similar sites commonly remains at the site of the spill until it is washed away with water by way of a rainfall or a hose-cleaning operation. Of, course, as the residue and/or spilled material is washed to a drain, it is likely to be carried to and mixed with the water supply (e.g. lakes, etc.) from which drinkable water is taken. Similar problems and environmental concerns arise at alternative sites, such as in a leaching pool designed as a detention basin, for filtering, for example, wastewater, stormwater, free-phased organics, petroleum spills, nonpoint source discharge water, vehicle washdown wastewater, wastewater from secondary containment dikes, excavation and construction sites, underground storage tank removals, emergency response conditions, remote wash down areas, and captured water at stream crossings for timber cutting sites.

It is known that treatment systems can be installed within a drainage system for filtering drainwater which enters the drainage system by way of a storm drain so that the water which eventually makes its way through the piping of the drain is filtered of pollutants or other contaminants. However, it would be desirable to provide a drainwater treatment system whose structure and filtration capabilities improves upon those of the drainwater treatment systems of the prior art.

Accordingly, it is an object of the present invention to provide a new and improved drainwater treatment system for installation within a drainage system for filtering contaminants from drainwater flowing therethrough.

Another object of the present invention is to provide such a treatment system which is well-suited for use in a vertical passageway of a drainage system wherein water flows into the vertical passageway through a surface opening of the drainage system.

Still another object of the present invention is to provide such a treatment system which provides a relatively high exposure of drainwater to filter medium as drainwater flows through the treatment system.

Yet another object of the present invention is to provide such a treatment system which permits drainwater to bypass the filter medium during storm flow conditions.

A further object of the present invention is to provide such a system which is uncomplicated in construction and effective in operation.

SUMMARY OF THE INVENTION

This invention resides in a drainwater treatment system positionable within the flow passage of a drainage system having a surface opening through which drainwater enters the drainage system and a vertical passageway which extends downwardly from the surface opening.

The treatment system includes a catch basin positionable within the vertical passageway of the drainage system for accepting all of the drainwater expected to flow downwardly into the vertical passageway from the surface opening. The catch basin has an upper edge across which drainwater is permitted to flow from the catch basin when the drainwater collected within the catch basin reaches the level of the upper edge. The treatment system also includes a filter-supporting section joined to the catch basin for accepting drainwater which flows out of the catch basin across the upper edge thereof so that the drainwater accepted by the filter-supporting section flows downwardly therethrough. A first filter is supported within the filter-supporting section for filtering contaminants from the drainwater which flows downwardly through the filter-supporting section, and a second filter is supported within the filter-supporting section for filtering additional contaminants from the drainwater wherein the first and second filters are supported by the filter-supporting section in registry with the expected flow path of drainwater flowing downwardly through the filter-supporting section. Associated with the catch basin and the filter-supporting section are means providing an overflow through which drainwater is permitted to bypass the first and second filters and continue to flow along the drainage system when the flow rate of drainwater into the system exceeds the rate at which drainwater is permitted to flow downwardly through the first and second filters.

DETAILED DESCRIPTION OF THE ILLUSTRATED EMBODIMENTS

Figure 1:
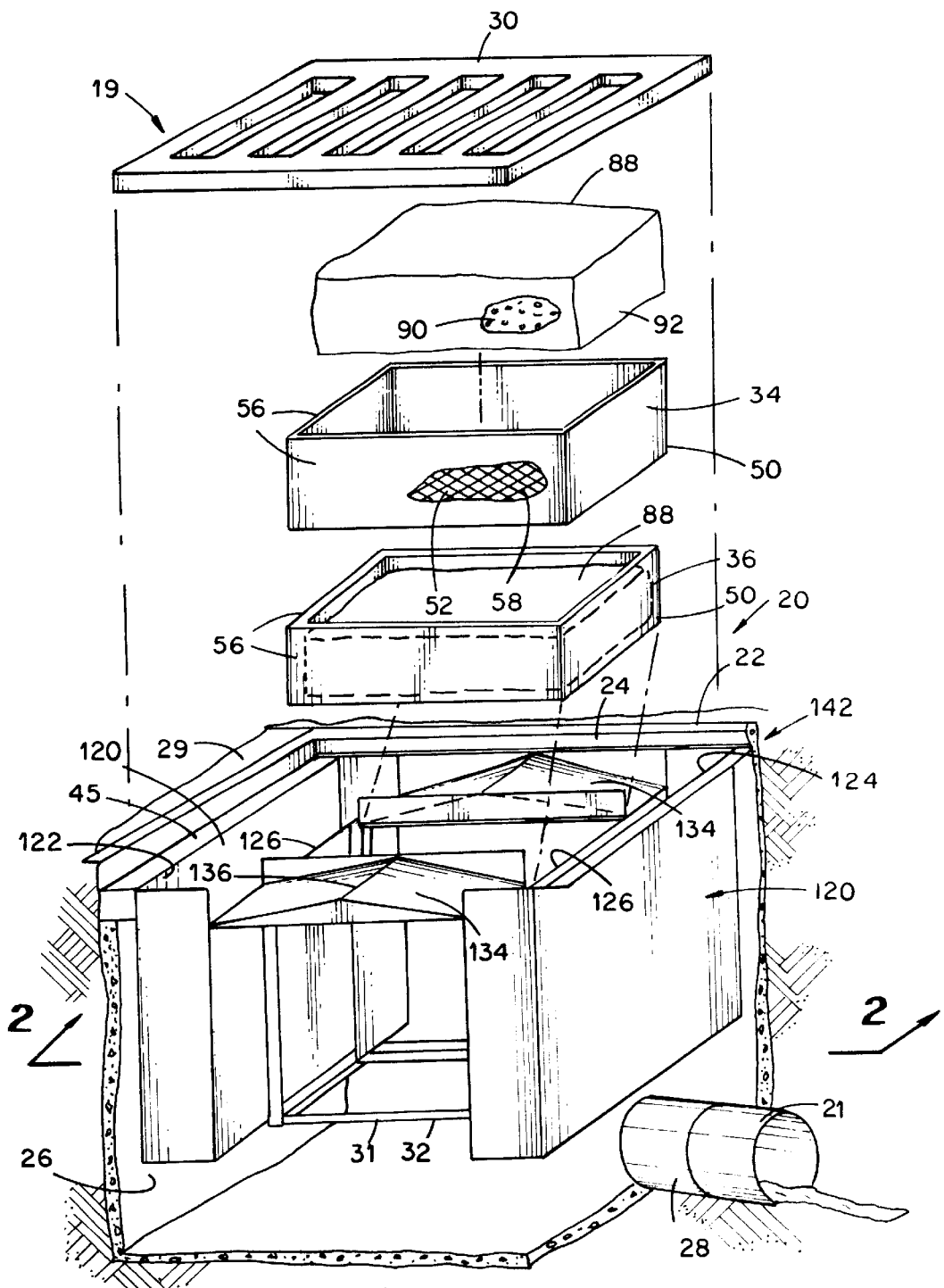
FIG. 1 is a perspective view, shown partially cutaway, of an embodiment of a drainwater treatment system shown installed beneath the storm drain of a drainage system.

Turning now to the drawings in greater detail and considering first FIG. 1, there is illustrated an embodiment of a drainwater treatment system, generally indicated 20, shown positioned in a typical environment of intended use. In particular, the environment of FIG. 1 includes a storm drain system 19 having an underground piping network 21, a surface opening, such as a storm drain 22, and a vertical passageway 26 disposed beneath and extending downwardly from the storm drain 22. The storm drain 22 includes an upwardly-opening mouth having a periphery 24 opening downwardly into the passageway 26. A drain conduit 28 is joined in flow communication with the passageway 26 at the lower end thereof so that drainwater which flows into the piping network 21 by way of the mouth 24 of the drain 22 flows through the passageway 26 and out of the vertical passageway 26 through the conduit 28. A rectangular grate support 29 is affixed about the periphery 24 of the drain 22, and an iron grate 30 is removably positioned across the mouth 24 as the edges of the grate 30 rest upon the grate support 29.

Figure 2:
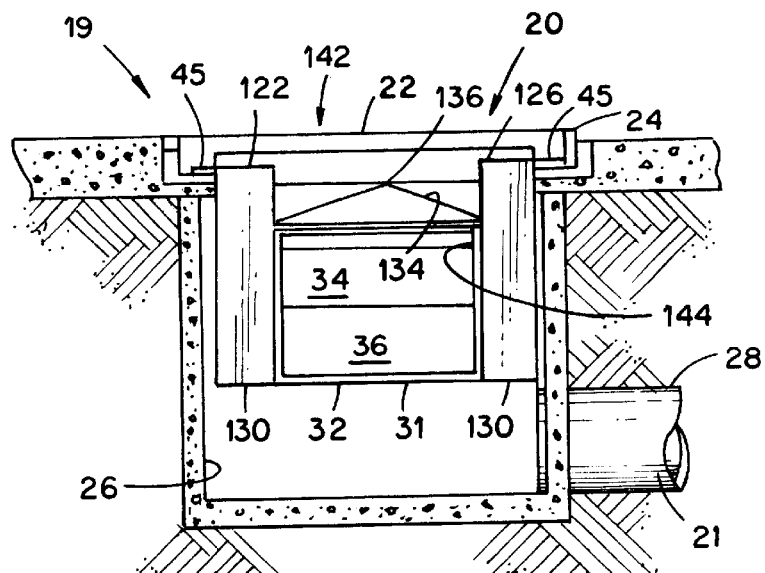
FIG. 2 is a side elevational view of the assembled embodiment of FIG. 1, shown assembled and as viewed about along line 2—2 of FIG. 1.

As will be apparent herein, the treatment system 20 is positionable within the passageway 26 of the drain system 19 for treating, i.e. filtering, drainwater which flows into the drain 22 so that the drainwater which exits the passageway 26 through the conduit 28 is substantially free of contaminants, such as petroleum pollutants, sediments and suspended solids. To this end and as best shown in FIG. 2, the system 20 includes a filter-supporting section 31 having a frame 32 which is positionable within the vertical passageway 26 of the drain 22 and a plurality of (e.g. two) filter-supporting receptacles 34 and 36 supported in a stacked relationship within the frame 32. The filter-supporting receptacles 34 and 36 are designed to permit a flow of drainwater generally downwardly in sequence through the receptacles 34 and 36 while preventing the collection of standing water within any one of the receptacles 34 and 36. Furthermore, there is positioned within the receptacles 34 and 36 suitable filters, described herein, so that substantially all of the pollutants which may be contained within the drainwater when it enters the vertical passageway 26 by way of the periphery 24 of the drain 22 is filtered from the drainwater by the filters.

Figure 3:
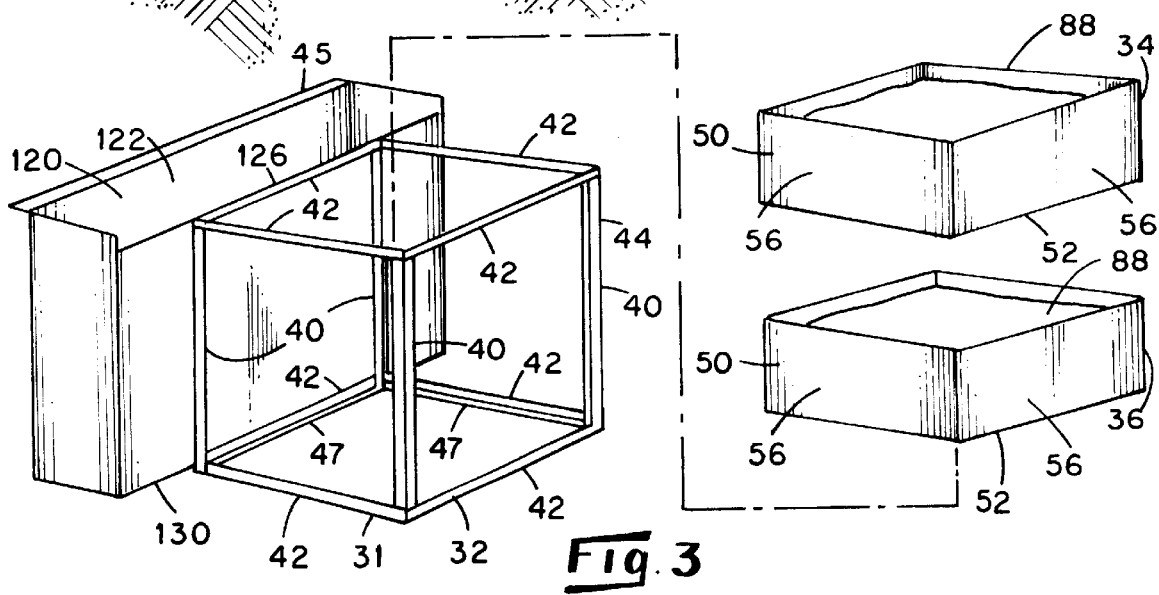
FIG. 3 is a perspective view of selected components of the FIG. 1 embodiment, shown exploded.

With reference to FIG. 3, the frame 32 includes a plurality (e.g. twelve) of elongated members 40, 42 constructed, for example, of angle iron, which have been joined together at the ends in a substantially rectangular arrangement 44 so that four of the members 40 provide vertical side edges of the arrangement 44 and eight of the members 42 provide the top and bottom edges of the arrangement 44. The (four) members 42 arranged along the bottom of the arrangement 44 provide an inwardly-extending lip 47 which prevents the passage of the receptacles 34 and 36 through the bottom of the frame 32 when the receptacles 34 and 36 are positioned therein.

Each filter-supporting receptacle 34 or 36 includes an upwardly-opening box-like compartment 50 having a bottom 52 and sidewalls 56, respectively. The bottom 52 is comprised of perforated material having openings 58 (FIG. 1) therein which are joined at its corners to the sidewalls 56 to provide the box-like shape of the receptacle 34 or 36 so that its interior edges are lower than its outer edges and include a plurality of openings 58 therethrough. Together, the bottom 52 and sidewalls 56 collectively provide the compartment 50 within which a filter medium is positioned for purposes of filtering drainwater which flows through the receptacle 34 or 36.

With reference again to FIGS. 1–3, the system 20 includes a catch basin 120 having sections 122 and 124 which are disposed on opposite sides of the filter-supporting frame 32 and attached thereto, as by welding. The catch basin sections 122 and 124 are intended to collect the drainwater which flows downwardly through the storm drain22 before the drainwater is subsequently directed through the filter-supporting sections 34 and 36. To this end, the catch basins 122 and 124 are in the form of upwardly-opening box-like receptacles which are attached to the frame 32 so that when installed within the passageway 26 of the storm drain system 19, the openings of the basin sections 122 and 124 are disposed beneath the periphery 24 of the surface opening of the storm drain 22. In addition, each basin section 122 or 124 includes an upper edge section 126 across which the drainwater is permitted to flow (and thereby exit the section 122 or 124) when the level of the drainwater collected in the section 122 or 124 reaches the level of the upper edge section 126. The basin sections 122 and 124 are attached to the frame 32 so that the upper edge sections 126 thereof are positioned close to the frame 32. With the upper edge sections 126 disposed in such a relationship to the frame 32, drainwater which flows across the upper edge sections 126 of the basin sections 34 and 36, the drainwater flows inwardly with respect to the periphery 24 of the storm drain 22.

For supporting the treatment system 20 in a suspended condition within the vertical passageway 26, there is associated with each basin section 122 and 124 an outwardly-extending lip 45 which is adapted to rest upon the grate support 29 adjacent the periphery 24 so that when the system 20 is positioned within the vertical passageway 26, the entire weight of the system 20 is suspended from the lips 45.

Each basin section 122 or 124 acts as a settling chamber within which debris and suspended solids are permitted to settle from the drainwater as it collects within the basin section 122 or 124 and includes a bottom, or floor 130, upon which the debris and other solids are permitted to collect. It is a feature of the catch basin 120 that its sections 122 and 124 have a depth (as measured between the floor 130 and the upper edge section 126) which is relatively great to provide a relatively deep internal cavity within which debris and suspended solids are permitted to collect. To this end and as best illustrated in FIG. 2, each basin section 122 or 124 extends downwardly into the vertical passageway to an elevation which is at least as low as the lowest elevation of the filter-supporting frame 32 so that the floor 130 of each basin section 122 or 124 is at least as low (if not lower) than that of the lowest filter medium supported by the frame 32. Along the same lines, the depth of the basin sections 122 and 124 is at least as great as the height of the filter-supporting frame 32.

In the depicted system 20, not all of the periphery of the storm drain 22 directly overlies the opening of the catch basin sections 122 and 124. Therefore, drainwater which falls from some sections of the periphery 24 of the storm drain 22 does not fall directly into the one of the catch basin sections 122 or 124. However, for purposes of directing the drainwater which flows downwardly across these segments of the periphery 24 into at least one of the catch basin sections 122 or 124, the system 20 includes a pair of flow deflectors 134 (best shown in FIGS. 1 and 2) which are joined between the catch basin sections 122 and 124 on opposite sides of the frame 32 so as to span the spacing between the basin sections 122 and 124. Each of the flow deflectors 134 is in the form of an inverted V having an upwardly-directed apex 136 and provides a pair of platen-like flow channels which extend angularly downwardly from the apex 136 of the V-shape of the deflector 134 toward the upwardly-directed opening of a corresponding catch basin section 122 or 124. Each deflector 134 underlies the segments of the storm drain periphery 24 not underlain by either of the upwardly-directed opening of the catch basin section 122 or 124 so that any drainwater which falls from these periphery segments falls onto the channels of one of the deflectors 134 and is directed (e.g. rightwardly or leftwardly as viewed in FIG. 2) into a corresponding basin section 122 or 124.

Each of the aforedescribed components (i.e. the catch basin sections 122, 124, the frame 32 and receptacles 34, 36) can be constructed of any of a number of materials, such as steel. However, to lengthen the life of the system 20, the system components are preferably constructed of out of stainless steel.

As mentioned above, suitable filters are positioned within the sections 34 and 36 for filtering pollutants and other desired constituents from drainwater when as it flows through the system 20. In the depicted system 20 and with reference to FIGS. 1–3, the filters which are positioned within each of the sections 34 and 36 are identical in construction and composition accordingly, bear the same reference numeral 88. As best shown in FIG. 1, each filter 88 includes a filter medium 90 packaged in a somewhat flexible, porous container 92 which provides the container 92 with a block-like shape and a size which generally corresponds with the shape of the interior of the section 34 or 36. A filter medium 90 which is well-suited for use in the system 20 is a hydrophilic material manufactured from waste pulp and packaged in a flexible, mesh package available from Absorption Corp. of Bellingham, Wash. under the trade designation Absorbent W. The Absorption W product has been found to suitably absorb oil and grease, TSS, barium, chromium, and lead from drainwater routed through the sections 34 and 36. Basically, the Absorbent W product utilizes the natural capillary action of cellulose fiber to draw unwanted contaminants into the interior of the fiber. It will be understood, however, that the filter medium which is ultimately used in the system 20 can be selected based upon the contaminant desired to be filtered from the drainwater.

To install the system 20 within the storm drain 22 and with reference again to FIG. 1, the grate 30 is removed from the grate support 29 and then the filter-supporting frame 32, with basin sections 122 and 124 attached to each side thereof, is lowered through the opening of the storm drain 22 until the lips 45 associated with the basin sections 122, 124 rest upon the edges of the grate support 29. The sections 36 and 34, with the corresponding filters 88 positioned therein, are then positioned in sequence within the frame 32 so that the upper section 34 is supported by the section 36 previously positioned within the frame 32. The lowermost receptacle is prevented from exiting the bottom of the frame 32 by the lip 47 associated with the bottom edges of the frame 32. It follows that when situated within the frame 32, the receptacles 34 and 36 are arranged within a stacked, superposed relationship.

Figure 4:
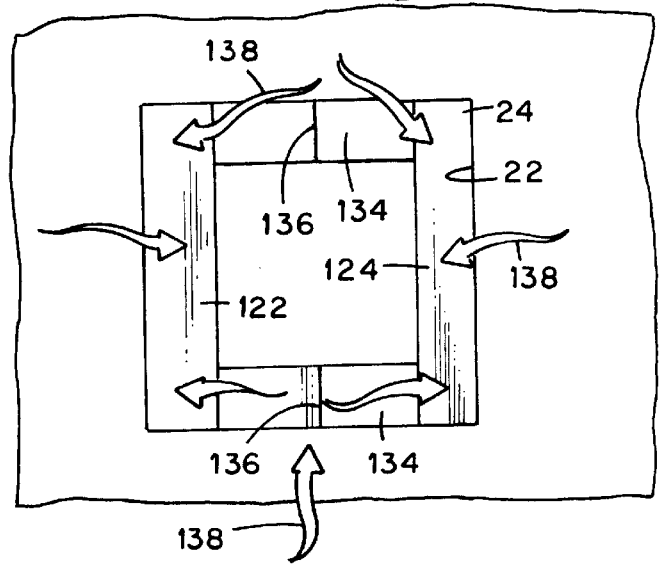
FIG. 4 is a plan view of the FIG. 1 system, shown with the grate removed from the drain and illustrating exemplary flow paths of water into the FIG. 1 treatment system.

As drainwater flows into the grate 30 during a rainfall or other cleansing operation and with reference to FIG. 4 wherein the flow paths of water are depicted with flow arrows 138, the drainwater flows over the edges of the periphery 26 and downwardly either directly into the catch basin sections 122 and 124 or along the flow channels of the flow deflectors 134 into the catch basin sections 122 and 124 where the drainwater is permitted to accumulate. As mentioned earlier, the basin sections 122, 124 operate as settling chambers within which unwanted debris and suspended solids are permitted to settle from the drainwater. Upon collection of drainwater within the catch basin sections 122, 124 until the level of drainwater therein reaches the level, or elevation, of the upper edge section 126, drainwater begins to exit the catch basin sections 122, 124 and flow across the upper edge sections 126 thereof into the filter-supporting section 31. Then, after passing through the filter-supporting receptacle 34, the drainwater flows into the next filter-supporting receptacle 36 from the receptacle 34 by way of the openings 58 provided in the bottom thereof. After passing through the receptacle 36, the drainwater flows into the portion of the drain system 19 situated beneath, or downstream of, the frame 32 and ultimately out of the vertical passageway 26 through the conduit 28. Of course, as the drainwater passes in sequence through the filter-supporting receptacles 34 and 36, the drainwater is exposed to and is filtered by the filter medium of the filters 88.

Another feature of the depicted FIG. 1 system 20 relates to its provision of an overflow-providing means, generally indicated 142 which permits drainwater to bypass the filter-supporting receptacles 34 and 36 when drainwater flows into the system 20 from the storm drain 22 at a flow rate that exceeds the flow rate of drainwater flowing downwardly through the filters 88. Such high flow rates of drainwater into the system 20 could be attained during storm or heavy rainfall conditions, and it is not normally desirable that the filters 88 obstruct the movement of drainwater through the vertical passageway 26. In this connection and as best shown in FIG. 2, the overflow-providing means 142 includes an opening 144 defined between each upper member 42 of the filter-supporting frame 32 which spans the spacing between the catch basin sections 122 and 124 and the upper edges of the receptacle 34 through which drainwater is permitted to flow when the level of drainwater accumulates atop the uppermost filter 88 reaches the level of the upper edges of the receptacle 34. Since the filter-supporting frame 32 is spaced from the sidewalls of the vertical passageway 26 on the sides of the frame 32 which extend between the basin sections 122 and 124, this spacing provides a vertical passageway through which any drainwater which flows out of the opening 144 from the filter-supporting section 34 is permitted to flow unobstructed to the bottom of the vertical passageway 26.

Figure 5:
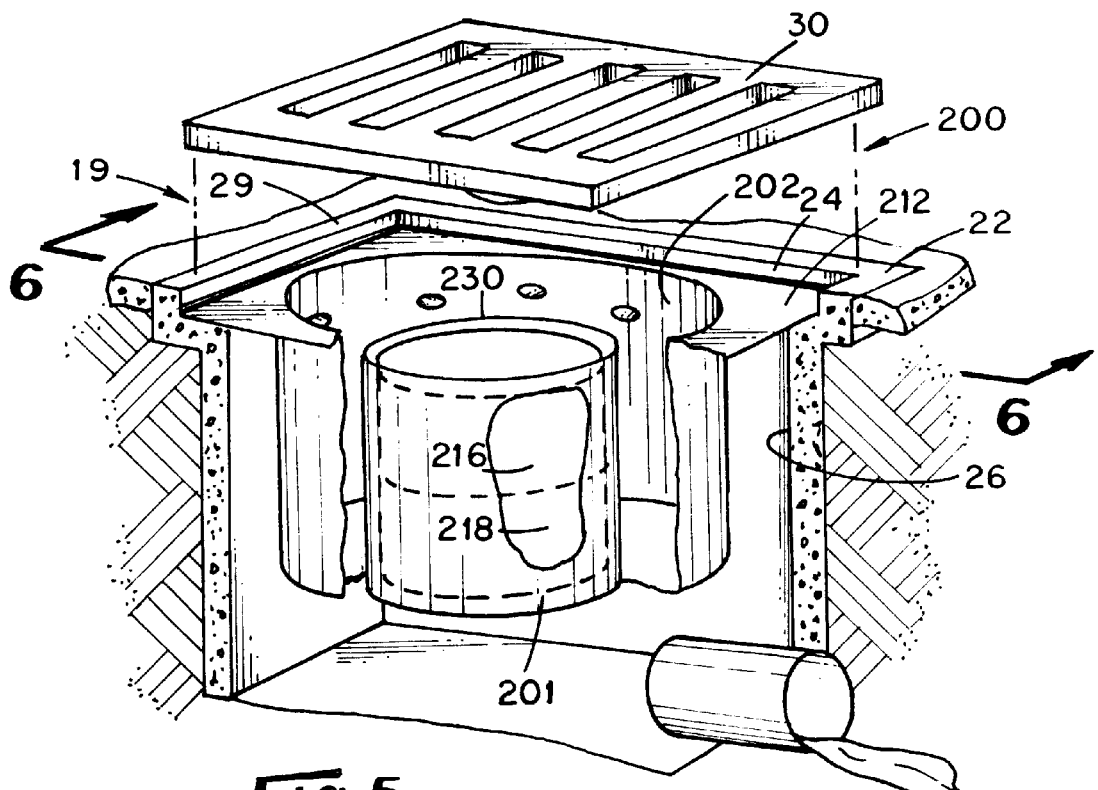
FIG. 5 is a perspective view, similar to that of FIG. 1, of another embodiment of a drainwater treatment system.
Figure 6:
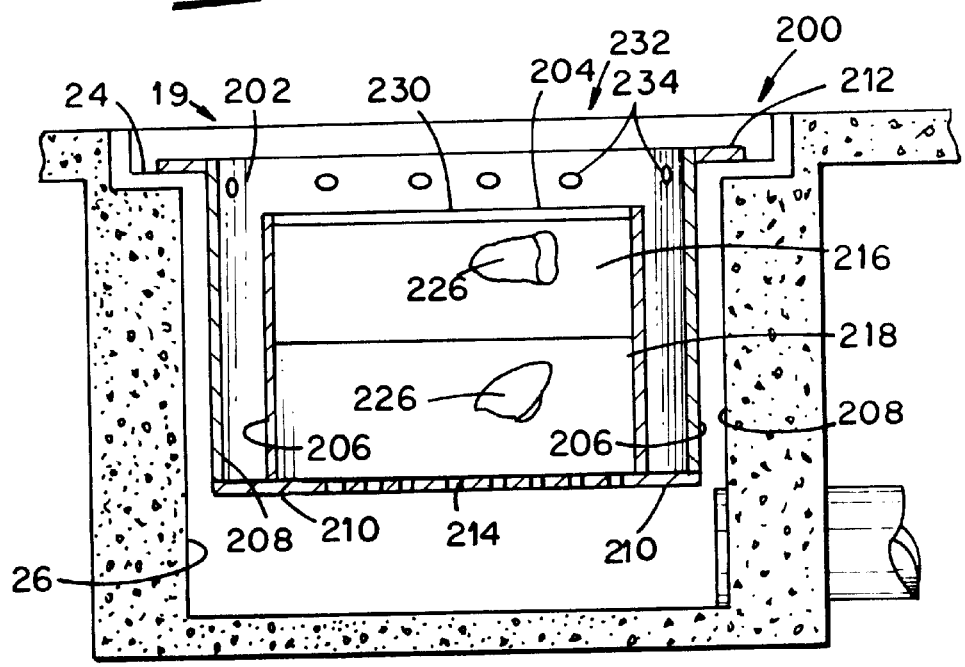
FIG. 6 is a side elevational view of the embodiment of FIG. 5 as viewed about along line 6—6 of FIG. 5.
Figure 7:
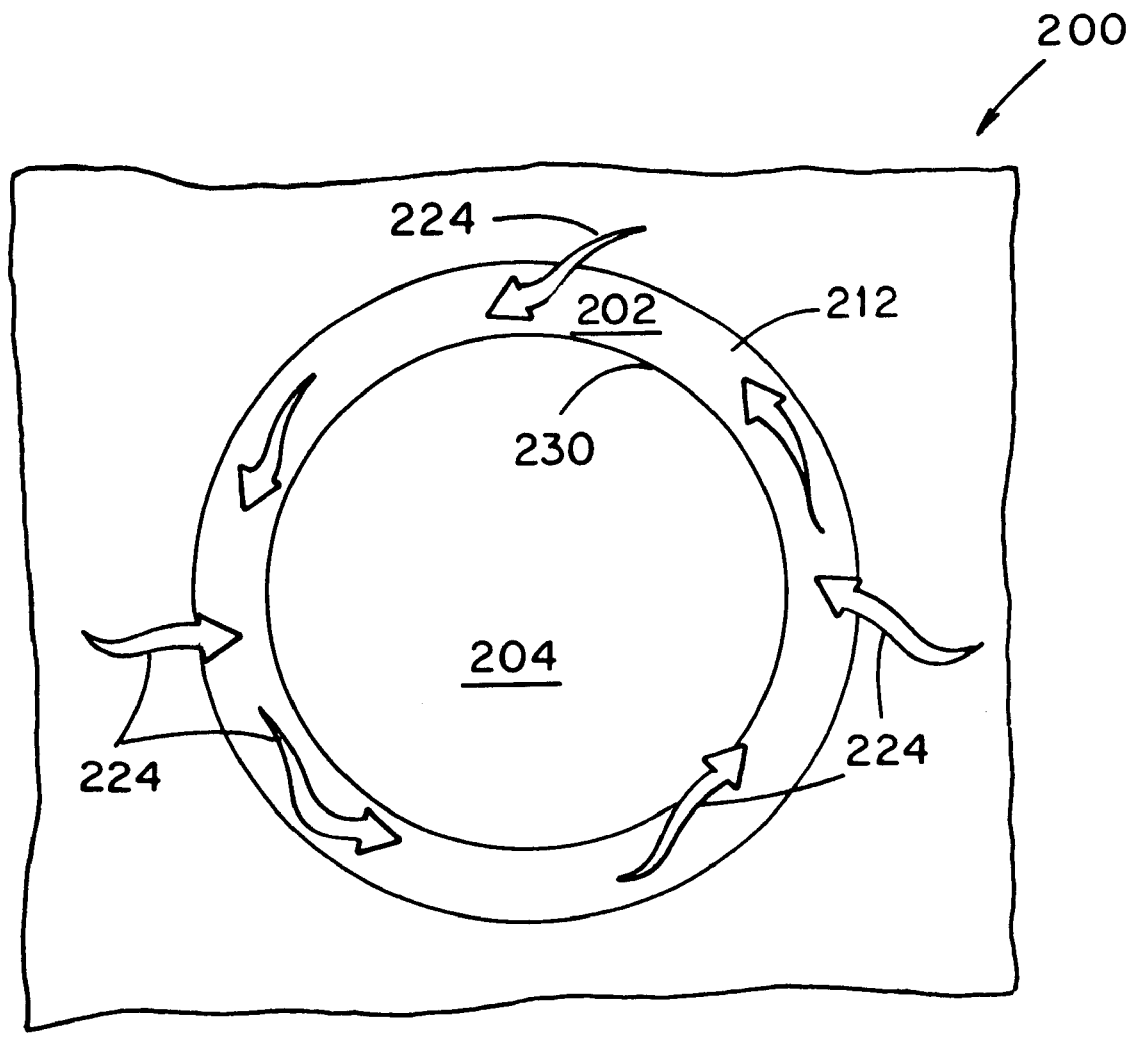
FIG. 7 is a plan view of the FIG. 5 system, shown with the grate removed from the drain and illustrating exemplary flow paths of water into the FIG. 5 treatment system.

With reference to FIGS. 5–7, there is illustrated another embodiment, generally indicated 200, of a system in accordance with the present invention shown installed within the vertical passageway 26 of a storm drain system 19. The drain system 19 of FIG. 5 is identical to that of the FIG. 1 system 19, and accordingly, its components bear the same reference numerals. The embodiment 200 of FIG. 5 includes a structure comprising an outer, ring-like catch basin 202 and a filter-supporting section 204 disposed inwardly of the catch basin 202 so that the catch basin 202 encircles the filter-supporting section 204. The catch basin 202 is provided by a pair of concentrically-arranged inner and outer sidewalls 206, 208, respectively, and a solid floor 210 which is joined to so as to extend between the inner and outer sidewalls 206, 208 at the lower edges thereof. In addition, a horizontally-arranged lip 212 is attached so as to extend outwardly of the outer sidewall 202 adjacent the top thereof for supporting the system 200 within the vertical passageway 212 as the lip 212 rests upon the periphery of the storm drain 22. Since the periphery 24 of the depicted storm drain 22 is rectangular (i.e. square) in form, the outer perimeter of the lip 212 is rectangular in form as well to correspond with the shape of the drain periphery 24.

The top edge of the inner sidewall 206 provides the upper edge of the catch basin 202 across which drainwater is permitted to flow in order to exit the catch basin 202. In other words, when the level of drainwater collected within the catch basin 202 reaches the level of the upper edge, indicated 230, of the sidewall 206, the drainwater begins to flow across the upper edge 230 from the catch basin 202 and into the filter-supporting section 204.

The filter-supporting section 204 is provided, in part, by the inner sidewalls 206 and a perforated floor 214 joined to so as to extend along the bottom of the sidewalls 206. Collectively, the floor 214 and the inner sidewalls 206 provide an interior cavity within which filter medium is positioned for filtering drainwater which flows downwardly therethrough. For supporting filter medium within the cavity of the filter-supporting section 204, there is provided a pair of filter-supporting receptacles 216, 218 which are positionable within the cavity of the section 204 for supporting filters 226 positioned therein. Each filter-supporting receptacle 216, 218 is cylindrical, or more specifically cup-like, in shape and includes a solid, cylindrical sidewall and a perforated floor. The receptacles 216, 218 are positionable in the cavity of the filter-supporting section 204 in a stacked relationship so that drainwater which flows into the filter-supporting section 204 from the catch basin 202 flows downwardly through the receptacle 216 and through the filter medium supported therein into, and eventually through, the receptacle 218.

The filter medium of the filters 226 positionable within the receptacles 216 and 218 can be comprised of a hydrophilic material such as, for example, the aforedescribed Absorbent W material. The filter medium can be placed loose (i.e. unpackaged) into each receptacle 216 or 218 or, in the alternative, contained within porous bags sized to fit within the interior cavity of the receptacle 216 or 218. In either event, the filter medium filters pollutants and other desired constituents from the drainwater as it flows downwardly through the filter-supporting section 204.

During use, drainwater flows downwardly into the catch basin 202 from the periphery of the storm drain 22 in directions, for example, corresponding with the directions of the FIG. 7 flow arrows 224 where debris and suspended solids are permitted to settle out of the drainwater and collect in the bottom of the basin 202. When drainwater accumulates within the catch basin 202 to the level of the upper edge 230, the drainwater begins to flow from the basin 202 across the upper edge 230 and into the filter-supporting section 204 where it is filtered as it flows downwardly through the filters 226 supported therein. The drainwater is thereafter permitted to flow out of the filter-supporting section 204 through the perforated floor thereof into the bottom of the vertical passageway 26 and eventually out through the conduit 28.

The system 200 is also provided with an overflow-providing means, generally indicated 232, which permits drainwater to exit the system 200 and thereby bypass the filters 226 when the drainwater flows into the storm drain at a faster rate than the drainwater is permitted to flow through the filters 226. In the system 200, the overflow-providing means 232 includes a plurality of openings 234 defined in the outer sidewall 208 adjacent the top edge thereof so that when the level of drainwater appreciably exceeds the level of the upper edge 230 of the catch basin 202, the water can exit the system 200 through the openings 234 and flow downwardly along the outer surface of the outer sidewall 208 into the bottom of the vertical passageway 26.

Test Results

A series of field tests have been conducted with a system comparable to the system 20 of FIGS. 1–4 (and whose filters contained the aforedescribed Absorbent W filter medium) to demonstrate the effectiveness of the system 20 under intense field conditions. The site of the tests was at a convenience store and truck stop along a well-traveled interstate, and the system 20 was installed in a catch basin near the diesel fueling island which collects stormwater runoff and the wash down water from the surrounding 13,000 square foot area. The analytical data resulting from the test samplings show the discharge parameters in milligrams per liter for 1) the incoming water and 2) the outgoing water. The first tests showed a significant reduction in the levels of TSS (75.5%), oil and grease (98.1%), Barium (88.6%), Chromium (95.+%), and Lead (85.2%). There was also a notable reduction in BOD (85.1%) and COD (21.1%) levels with only minor changes in pH, air and water temperature. In addition, the levels or Ammonia (as Nitrogen), and TKN were reduced 76.6% and 81.1%, respectively.

The second test (sampling) followed the first test (sampling) by one month, and approximately nine inches of rainfall and two surface spills totalling more than 20 gallons of diesel fuel (in addition to the normal activities and spills at a truck stop). The filters were not replaced between the first and second test samplings. As in the first test, there were significant reductions in the levels of oil and grease (97.9%) and Chromium (77.4%). There were also notable reductions in BOD (57.5%), COD (62.3%), Ammonia (77.4%), TKN (80.9%), Barium (64.4%) and TSS (16.2%). Air temperature, water temperature and pH remained constant during the testing event. It could therefore be concluded from these tests that even as the filters approach a condition at which they should be replaced, the system 100 continues to remove a significant amount of pollutants from the drainwater routed therethrough.

The third test (sampling) followed the second test (sampling) by about two weeks and followed the replacement of fresh filters. No rainfall was recorded for the period between the second and third tests. Consequently, the collected data yielded lower concentrations of contaminants for the incoming water. As before, the data showed reductions in the levels of oil and grease (49.2%) and TSS (76.0%), as well as significant reductions in BOD (56.8%), COD (63.5%), Ammonia (75.0%0, TKN (80.0%), Barium (55.0%), and Lead (44.3%). Air, water temperature and pH remained relatively constant during the testing event.

It follows from the foregoing that a drainwater treatment system has been described which provides a highly effective and economical means of pollution prevention by removing hazardous wastes and other regulated pollutants from storm-water runoff and wastewater discharges. Contaminated water enters the system and the contaminants of concern are extracted in a multi-stage filtering process using, as in the case of the Absorbent W filter medium, reclaimed materials. Considering the fact that stainless steel out of which the filter-supporting receptacles are preferably constructed, is comprised largely of reclaimed steel so that the entire filtering system is environmentally-friendly. Moreover, the system is easily serviceable in that its filters can be readily installed or replaced when necessary.

It will be understood that numerous modifications and substitutions can be had to the aforedescribed embodiment without departing from the spirit of the invention. For example, although the aforedescribed embodiments have been described for installation within storm drain systems having cavities and convergence pipes, an embodiment in accordance with the broader aspects of the invention can be designed for installation within alternative site-specific applications, such as in a leaching pool designed as a detention basin, for filtering, for example, wastewater, stormwater, free-phased organics, petroleum spills, nonpoint source discharge water, vehicle washdown wastewater, wastewater from secondary containment dikes, excavation and construction sites, underground storage tank removals, emergency response conditions, remote wash down areas, and captured water at stream crossings for timber cutting sites.

Furthermore, each of the aforedescribed systems 20 and 200 can be adapted to include a sampling tray along the underside of the lowermost filter-supporting section enabling an operator to extract samples of the filtered drainwater to ensure regulatory compliance and that the efficiency of the system is maintained. Access can be had to the sample tray (for collecting a sample amount of drainwater therefrom) by way of a flexible tube routed through the filter-supporting receptacles. Accordingly, the aforedescribed embodiments are intended for the purpose of illustration and not as limitation.

What is claimed is:

1. A drainwater treatment system positionable within the flow passage of a drainage system having a surface opening through which drainwater enters the drainage system and a vertical passageway which extends downwardly from the surface opening, the treatment system comprising:

catch basin means positionable within the vertical passageway of the drainage system for accepting all of the drainwater expected to flow downwardly into the vertical passageway from the surface opening, the catch basin means including outer sidewalls for extending downwardly into the vertical passageway and which are disposed on opposite sides of the treatment system from one another, the catch basin means further including means defining an upper edge across which drainwater is permitted to flow from the catch basin means when the drainwater collected within the catch basin means reaches the level of the upper edge, the upper edge of the upper edge-defining means having opposing portions which are disposed laterally inwardly of the outer sidewalls of the catch basin means and which are laterally spaced apart from one another so that drainwater which is permitted to flow across the opposing portions of the upper edge flows inwardly of the outer sidewalls of the catch basin means and so that drainwater which flows across one of the opposing portions of the upper edge flows in a direction thereacross which is opposite the direction in which drainwater flows across the other of the opposing portions of the upper edge;

a filter-supporting section associated with the catch basin means for accepting drainwater which flows out of the catch basin means and across the upper edge of the upper edge-defining means so that the drainwater accepted by the filter-supporting section flows downwardly therethrough;

filter means including at least one filter which is supported within the filter-supporting section for filtering contaminants from the drainwater which flows downwardly through the filter-supporting section; and means associated with the catch basin means and the filter-supporting section providing an overflow through which drainwater is permitted to bypass the filter means and continue to flow along the drainage system when the flow rate of drainwater into the system exceeds the rate at which drainwater is permitted to flow downwardly through the filter means.

2. The treatment system as defined in claim 1 wherein the catch basin means has a floor and a depth as measured between the upper edge of the upper edge-defining means and the floor thereof, and the depth of the catch basin means is about the same as the height of the filter-supporting section.

3. The treatment system as defined in claim 1 wherein each of the catch basin means and the filter-supporting section extends downwardly into the vertical passageway of the drainage system when the treatment system is positioned therein, and the catch basin extends downwardly into the drainage system at least as far as does the filter-supporting section.

4. The treatment system as defined in claim 1 wherein the catch basin means has a floor, and the floor of the catch basin means is positioned at an elevation which is below the elevation of the first and second filters.

5. The treatment system as defined in claim 1 wherein the filter means includes a first filter and a second filter which are each supported within the filter-supporting section and wherein the filter-supporting section includes a first upwardly-opening receptacle within which the first filter is positioned and a second upwardly-opening receptacle within which the second filter is positioned and each of the upwardly-opening receptacle sections includes a bottom surface having a plurality of openings through which drainwater is permitted to flow after the drainwater passes through the corresponding filter supported therein.

6. The treatment system as defined in claim 5 wherein the upwardly-opening receptacle sections are provided by separate unitary structures, and the treatment system further comprises a frame for supporting the receptacle sections in stacked relationship with one another so that the drainwater which is permitted to flow from the receptacle section in which the first filter is positioned flows into the receptacle section within which the second filter is positioned.

7. The treatment system as defined in claim 5 wherein each of the first and second filters are comprised of a hydrophobic material.

8. The drainwater treatment system as defined in claim 5 wherein the overflow-providing means provides an opening which is higher than that of the first filter.

9. The drainwater treatment system as defined in claim 1 wherein the vertical passageway within which the system is positionable includes walls, and the outer sidewalls of the catch basin means extend downwardly into the vertical passageway and are spaced from the walls thereof when the system is positioned therein, and the openings of the overflow-providing means are defined in the outer sidewalls of the catch basin means.

10. The drainwater treatment system as defined in claim 1 wherein the surface opening has a periphery over which the drainwater falls downwardly toward the treatment system, and the system further includes a flow deflector for channeling drainwater which falls from the periphery of the surface opening toward the catch basin means.

11. A drainwater treatment system positionable within the flow passage of a drainage system having a surface opening through which drainwater enters the drainage system and a vertical passageway which extends downwardly from the surface opening, and the surface opening has a periphery thereabout over which drainwater falls downwardly toward the treatment system, the treatment system comprising:

relatively deep catch basin means positionable within the vertical passageway of the drainage system including portions disposed adjacent the periphery of the surface opening and on opposite sides of the vertical passageway when the catch basin means is positioned therein for collecting drainwater expected to flow downwardly into the vertical passageway from the periphery of the surface opening, the portions of the catch basin means including outer sidewalls for extending downwardly into the vertical passageway and which are disposed on opposite sides of the treatment system from one another, the catch basin means further including means defining an upper edge across which drainwater is permitted to flow from the catch basin means when the level of the drainwater collected within the catch basin means reaches the elevation of the upper edge, and the upper edge of the upper edge-defining means has opposing portions which are disposed laterally inwardly of the outer sidewalls of the catch basin means and which are laterally spaced apart from one another so that drainwater which is permitted to flow across the opposing portions of the upper edge flows inwardly of the outer sidewalls of the catch basin means and so that drainwater which flows across one of the opposing portions of the upper edge flows in a direction thereacross which is opposite the direction in which drainwater flows across the other of the opposing portions of the upper edge;

a filter-supporting section associated with the catch basin means and positioned between the portions of the catch basin means disposed on opposite sides of the vertical passageway for accepting drainwater which flows from the catch basin means and across the upper edge of the upper edge-defining means so that the drainwater which is accepted by the filter-supporting section flows downwardly therethrough;

filter means including at least one filter which is supported within the filter-supporting section for filtering contaminants from the drainwater which flows downwardly through the filter-supporting section; and means associated with the catch basin means and the filter-supporting section providing an overflow having openings through which drainwater is permitted to flow from the treatment system and continue to flow along the drainage system while bypassing the filter means when the flow rate of drainwater into the system exceeds the rate at which drainwater is permitted to flow downwardly through the filter means.

12. The treatment system as defined in claim 11 wherein the catch basin means has a floor and a depth as measured between the upper edge of the upper edge-defining means and the floor thereof, and the depth of the catch basin means is about the same as the height of the filter-supporting section.

13. The treatment system as defined in claim 11 wherein each of the catch basin means and the filter-supporting section extends downwardly into the vertical passageway of the drainage system when the treatment system is positioned therein, and the catch basin means extends downwardly into the drainage system at least as far as does the filter-supporting section.

14. The treatment system as defined in claim 11 wherein the catch basin means has a floor, and the floor of the catch basin is positioned at an elevation which is below the elevation of the first and second filters.

15. The treatment system as defined in claim 11 wherein the filter means includes a first filter and a second filter which are each supported within the filter supporting section and wherein the system further includes a first upwardly-opening receptacle within which the first filter is positioned and a second upwardly-opening receptacle within which the second filter is positioned and each of the upwardly-opening receptacles is positioned within the filter-supporting section and includes a bottom surface having a plurality of openings through which drainwater is permitted to flow after the drainwater passes through the corresponding filter supported therein.

16. The treatment system as defined in claim 15 wherein the upwardly-opening receptacles are provided by separate unitary structures, and the filter-supporting section includes a frame for supporting the receptacles in stacked relationship with one another so that the drainwater which is permitted to flow from the receptacle in which the first filter is positioned flows into the receptacle within which the second filter is positioned.

17. The treatment system as defined in claim 15 wherein each of the first and second filters are comprised of a hydrophobic material.

18. The drainwater treatment system as defined in claim 15 wherein the overflow-providing means provides an opening which is higher than that of the first filter.

19. The drainwater treatment system as defined in claim 11 wherein the vertical passageway within which the system is positionable includes walls, and the outer sidewalls of the catch basin means extend downwardly into the vertical passageway and are spaced from the walls thereof when the system is positioned therein, and the openings of the overflow-providing means are defined in the outer sidewalls of the catch basin means.

20. The drainwater treatment system as defined in claim 11 wherein the system further includes a flow deflector for channeling drainwater which falls from the periphery of the surface opening toward the catch basin means.

* * * * *